United States Patent [19]
Lefebvre

[11] 3,793,919
[45] Feb. 26, 1974

[54] CUTTING DEVICE, PARTICULARLY FOR POSITIONING FASTENERS

[75] Inventor: Roger M. Lefebvre, Saint-Ame, France

[73] Assignee: Societe Francaise D'Agrafage Industriel, Vosges, France

[22] Filed: Dec. 17, 1971

[21] Appl. No.: 209,084

[30] Foreign Application Priority Data
Dec. 31, 1970 France .............................. 70.47546

[52] U.S. Cl. .................................... 83/583, 83/694
[51] Int. Cl. ........................................... B23d 35/00
[58] Field of Search ....................... 83/582, 583, 694

[56] References Cited
UNITED STATES PATENTS
2,982,066 5/1961 Thompson, Jr. .................. 83/583 X
1,139,572 5/1915 Perry ............................... 83/583 X
3,218,918 11/1965 Brindley et al. .................. 83/583 X
635,457 10/1899 Yandall ............................... 83/582

Primary Examiner—J. M. Meister
Attorney, Agent, or Firm—Stevens, Davis, Miller & Mosher

[57] ABSTRACT

A cutting device for use in a fastener handling machine. The device comprises a cutter blade and a counter blade each having respective cutting surfaces which interact when the cutter blade is moved towards the counter blade to produce a shearing action. The counter blade is spring urged against a fixed support and is movable laterally with respect to the direction of movement of the cutter blade and against the spring force by an inclined face on the cutter whereby the cutting edge of the counter blade is guided across the cutting edge of the cutter blade to produce a shearing action.

4 Claims, 2 Drawing Figures

PATENTED FEB 26 1974 3,793,919

CUTTING DEVICE, PARTICULARLY FOR POSITIONING FASTENERS

BACKGROUND TO THE INVENTION

The invention relates to a cutting device for use in a machine such as those for handling and positioning fasteners.

In order to pack products in bulk, it is known to enclose the products in a tubular casing, made for example of netting, and to isolate the quantities to be packed by means of fasteners positioned on either side of the section of the casing which encloses each quantity. Machines have been designed and are known for simultaneously positioning two fasteners on a clamped portion of the casing and severing the casing between the two fasteners. A machine of that kind is described in U.S. Pat. specification No. 3,279,033.

The tubular netting or other types of casing used for this type of packing method have recently become more and more difficult to cut and it is an object of the present invention to provide a cutting device which is effective, which can be easily positioned and dismantled and which requires the minimum of maintenance.

STATEMENT OF THE INVENTION

A cutting device comprising a cutter having a first cutting edge and a counter blade having a second cutting edge, means for moving the cutter in a first direction towards the counter blade, spring means for urging the counter blade laterally with respect to the said first direction of movement of the cutter, and an inclined surface on the cutter for separating the cutter from the counter blade, in opposition to the said spring means, to permit the cutting edges of the cutter and counter blade to engage against one another.

The following description with regard to the accompanying drawing given by way of a non-limitative example will assist in an understanding of how the invention can be put into practice.

DESCRIPTION OF THE PREFERRED EMBODIMENT

Figures 1, 2:
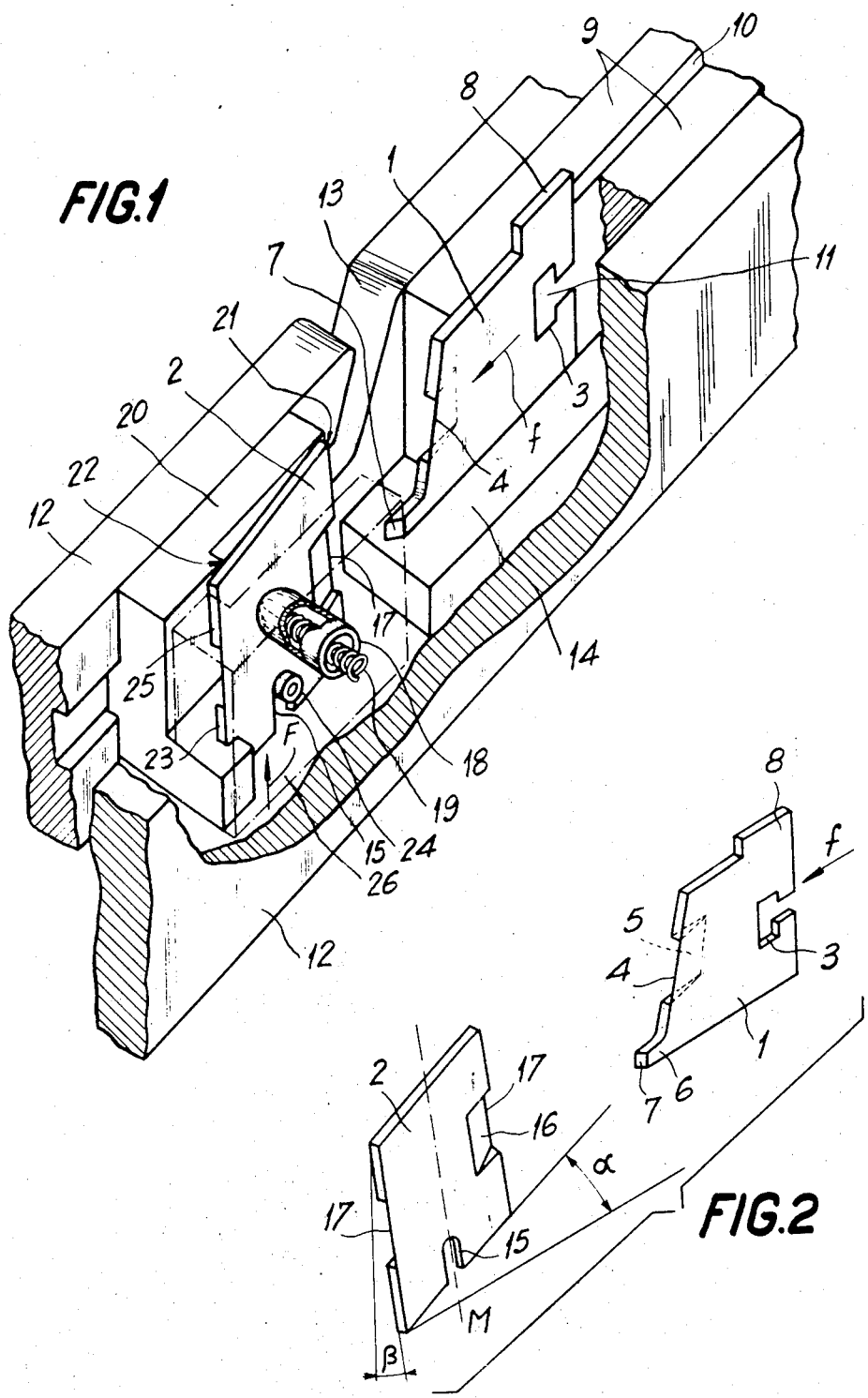
FIG. 1 shows a schematic and cut-away perspective view of a section of a fastener applicator provided with a cutting device in accordance with the invention.
FIG. 2 is a view, also in perspective, showing the mutual positioning of the cutters.

In the embodiment shown in the drawing, a cutting device comprises a cutter 1 and a counter blade 2.

The cutter 1 is formed by a small metal plate substantially in the form of a rectangular trapezium. One of the sides of the right angle which forms the rear of the cutter is hollowed to form a T-shaped mortise 3. In the center of the opposite side of the cutter 1, there is a cutting edge 4 which is inclined relative to the direction of movement of the cutter which is indicated by the arrow $f$. The cutting edge 4 is formed by a chamfered or beveled edge 5 formed in one of the major surfaces of the plate (see FIG. 2). The acute angle in front of the cutter plate 1 is extended by a tail 6 which ends in an inclined edge 7 extending in the opposite direction to the chamfered edge 5. Opposite the tail 6 there is provided a gripping heel 8.

The cutter 1 is mounted in the fastener applicator between push pieces 9 which serve to position the fasteners. The cutter 1 is moved with the aid of a metal plate or slide 10 which is formed with a T-shaped tenon 11 which engages in the mortise 3 (FIG. 1). The push pieces 9 slide through a frame 12 provided with grooves or slots 13, which serve to position the clamped portion or neck (not shown) of the casing to be fastened and cut. The cutter 1 and the slide 10 bear laterally against a plate 14 along which the tail 6 moves.

The counter blade 2 is formed by a rectangular plate, one side of which is provided with a U-shaped slot 15. The plate is symmetrical relative to the median plane M of the slot. In the center of the transverse sides of the counter blade, two chamfered edges 16 provide similar cutting edges 17 having substantially the same length as the cutting edge 4 of the cutter 1 and lying opposite the cutting edge 4. The counter blade 2 is also arranged relative to the cutter 1 in such a manner that the chamfered edge 16 of the cutting edge 17 lying nearest to the cutting edge 4, faces away from the chamfered edge 5 of the cutter 1.

As is shown in FIG. 2, the plane of the counter blade 2 forms an angle $\alpha$, the "clearance angle," of 10 to 30°, to the plane of the cutter 1 and, in addition, the cutting edges 17 form an angle $\beta$, the "sharpening angle," of 5° to 15° with the perpendicular to the direction $f$ of the movement of the cutter 1.

The counter blade 2 is maintained resiliently in position in the frame 12 by means of a finger 18 having a rounded head which is urged towards the counter blade by a spring 19. The finger 18 acts substantially on the center of the counter blade 2 and presses it against a support member 20 which forms one of the anvils of the fastener applicator and which has three bearing surfaces 21, 22 and 23 as well as a projection 24 which engages in the slot 15.

The bearing surface 21 lies substantially in the same plane as the major surface of the cutter 1 in which the leading edge of the incline 7 is located. The bearing surface 23 allows slight play to permit clearance of the counter blade during operation. An additional contact on the rear face 25 of the counter blade 2 is ensured by the second anvil 26 during the cutting operation.

When the machine is in operation and the cutter 1 moves towards the counter blade 2, the inclined edge 7 separates the counter blade from the bearing surface 21 against the pressure of the spring 19 which is compressed. The cutter and the counter blade are thus pressed against one another with their intersecting cutting edges 4 and 17 in contact. An effective scissors cutting action is therefor obtained as well as automatic sharpening of the edges.

To dismantle the counter blade 2, it is pushed in the direction of the arrow F, shown in FIG. 1, so as to draw it sufficiently out of the anvils that it can be gripped by hand and drawn out. It is replaced by the reverse process, the symmetry of the counter blade 2 preventing any error during assembly and increasing the life of the component. The path of the bearing finger 18 is, if necessary, limited so that the finger does not impede the re-positioning of the counter blade.

The cutter 1 is removed by loosening it until the tenon 11 moves out of the mortise 3. The cutter can then be drawn out by the heel 8.

The invention can be applied to all kinds of cutting devices and can be used to particular advantage on fastener applicators of the above-mentioned type.

It is obvious that the embodiment just described can be modified, particularly by the substitution of equivalent technical means, and without departing from the scope of the present invention.

Further minor modifications can be made to the above described embodiment without departing from the spirit and scope of the invention which is best described in the following claims.

What I claim is:

1. A cutting device, comprising:
    a frame having an elongated, laterally open slot therein;
    guiding members for a cutter mounted for longitudinal reciprocation in said slot, said guiding members having opposite and parallel flat faces;
    a cutter mounted on said guiding members and having at the end of one of said flat faces a cutting edge inclined with respect to the direction of said longitudinal reciprocation, said cutter also having a beveled tail portion extending in front of, in said direction, said cutting edge, the leading edge of said tail being located at the other of said flat faces;
    a counter-blade having a cutting edge for cooperation with the cutting edge of said cutter;
    a supporting member for said counter-blade, said supporting member located in said slot thereby providing an abutment for said counter-blade, and having a first bearing surface located substantially in the same plane as the leading edge of the tail of said cutter, and having a second bearing surface parallel to said first bearing surface;
    and spring means located within the slot in the frame, said spring means for urging said counter-blade toward said bearing surfaces.

2. The cutting device of claim 1 wherein said counter-blade has a slot in one side thereof, and two cutting edges symmetrically disposed with respect to the medial line of the slot in the counter-blade, said cutting edges located on the two ends of the counter-blade, and said supporting member comprises a projection for engaging the slot in the counter-blade.

3. The cutting device of claim 1 wherein said counter-blade is inclined so that its cutting edge is not parallel to the plane defined by the cutting edge of the cutter moved in the direction of said longitudinal reciprocation.

4. The cutting device of claim 1, additionally comprising an anvil member located in said slot as a supplemental abutment for said counter-blade.

* * * * *